United States Patent
Chen et al.

(10) Patent No.: US 6,176,117 B1
(45) Date of Patent: Jan. 23, 2001

(54) CALIBRATION INSTRUMENT FOR MICRO-POSITIVELY-SENSED FORCE AND CALIBRATION METHOD THEREFOR

(75) Inventors: Li-Sen Chen, Kaohsiung; Hung-Ju Yen, Hsinchu; Chih-Ming Wu, Taipei; Wei-Tai Jao, Hsinchu, all of (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/201,994

(22) Filed: Dec. 1, 1998

(51) Int. Cl.[7] ........................................... G01L 1/22
(52) U.S. Cl. .................................................. 73/1.15
(58) Field of Search ................... 73/1.01, 1.15, 73/1.13, 788, 795, 862.391

(56) References Cited

U.S. PATENT DOCUMENTS

| | | | |
|---|---|---|---|
| 3,956,919 | * 5/1976 | Vranas | 73/1.15 |
| 4,380,171 | 4/1983 | Smith . | |
| 5,020,357 | * 6/1991 | Kovacevic et al. | 73/1.15 |
| 5,092,154 | * 3/1992 | Eldridge et al. | 73/1.15 |
| 5,355,715 | * 10/1994 | Rausche et al. | 73/1.15 |
| 5,501,096 | * 3/1996 | Stettner et al. | 73/1.79 |

* cited by examiner

Primary Examiner—Max Noori
(74) Attorney, Agent, or Firm—Merchant & Gould P.C.

(57) ABSTRACT

A calibration instrument for micro-positively-sensed force, including: a platform support stand having a base with a vise thereon for clamping an elastically deformable strain measuring device to be calibrated, a micro-distance meter at an upper portion of the platform support, a probe connected to and positioned beneath the micro-distance meter, displacement of the probe in vertical direction being adjustable through the micro-distance meter, the probe having a load cell. The load cell and elastically deformable strain measuring device to be calibrated are each connected to a signal transmitting device which outputs the signals thererof to a signal amplifying device so as to display the signals being measured. And, a method for calibrating a calibration instrument for micro-positively-sensed force that uses the calibration instrument to calibrate a precision measuring device.

17 Claims, 3 Drawing Sheets

CALIBRATION INSTRUMENT FOR MICRO-POSITIVELY-SENSED FORCE AND CALIBRATION METHOD THEREFOR

FIELD OF INVENTION

This invention relates to a calibration instrument for micro-positively-sensed force and calibration method therefor, in particular to a device that utilizes a load cell and a micro-distance meter to measure and to calibrate an apparatus for measuring positively-sensed force of an electrical connector, and to a method for measuring two calibration curves of load of the apparatus vs. strain value, and of displacement vs. strain value. The apparatus for measuring positively-sensed force of an electrical connector is provided with a strain gauge on an elastically deformable sheet, where value of the-positively-sensed force of the connector terminals is obtainable by matching the measured strain value with the two calibration curves.

BACKGROUND OF INVENTION

In engineering an electrical connector, electrical connector terminals must consist of positively-sensed force of a certain amplitude in order to rub off oxides or sulfides of contact surfaces between a circuit board and the terminals thereby attaining acceptable conductive effects, maintaining sufficient contact area between the circuit board and the connector, and preventing fretting corrosion failure as a result of vibration. On the other hand, if other factors, such as wear reduction, spring rigidity and stability, are taken into account in engineering the connector, the positively-sensed clamping force of the electrical connector terminals effecting to the circuit board is preferred to be minimized so as to optimize connector performance. Therefore, how to maintain an appropriate positively-sensed force being effected to the circuit board is an important engineering issue being intensively observed while engineering new electrical connectors or modifying existing electrical connectors. Because amplitude of the positively-sensed clamping force that an electrical connector effects to a circuit board will eventually affect connector reliability and force required for inserting or withdrawing the connector into or from the circuit board, manufactures of electrical connectors have given much consideration to the amplitude of positively-sensed clamping force while engineering electrical connectors. However, apparatus for measuring positively-sensed force of an electrical connector is currently unavailable in the commercial market, where most of the time, connectors are split apart such that positively-sensed force is measured by conducting tensile test thereto. The majority of manufactures also rely on past experiences, repetitive experiments and design modifications to attain the desired positively-sensed clamping force. It is sometimes necessary to rely on the customers to evaluate whether the ultimate positively-sensed clamping force that the electrical connectors effect to the circuit board qualifies the customers' specifications. The only prior art known so far involves U.S. Pat. No. 4,380,171 that was published on Apr. 19, 1983. Hence, manufacturers of electrical connectors in general cost considerable experimental or trial-run expenditures and take an extended engineering term to attain the desired connectors, where such an engineering approach is obviously disadvantageous to the manufacturers in contending orders and in product manufacturing.

Currently, amplitude of the positively-sensed force of an electrical connector is obtained through two schemes, including analysis and experimentation, wherein the method of analysis mostly involves finite element analysis, from which the overall stress distribution and the positively-sensed clamping force of the electrical connector can be calculated. However, since in such a method numeral results are derived from specific mathematical modes, it is essential to select proper modes and to modify the results based on existent conditions in order to attain correct values. Thus, implementation of the method of analysis still relies on actual measurements of the positively-sensed force to verify the results of the finite elements analysis, to serve as a reference for modifying the analysis modes, and to help engineers who design the electrical connector to acquire feeling for the amplitude of the positively-sensed force. Therefore, taking actual measurements of the positive force is an extremely vital technique in engineering electrical connectors.

In addition, recent development of electronic industry has gradually reduced thickness of common circuit boards down to approximately 1 mm, or even thinner; compact and high density designs are thus trends that electrical connectors must follow, which trends eventually result in reduction of terminal volume and intensify difficulty for measuring the positively-sensed force of such miniature products. Most researches related to taking actual measurements of positively-sensed force of electrical connector terminals being conducted by research teams, are still in the conception stage. It is to the applicant's knowledge that commercial products that are equipped with such functions are currently unavailable in the market.

SUMMARY OF INVENTION AND RELEVANT PRIOR ART

It is a primary object of this invention to provide a device and a method for calibrating an apparatus for measuring positively-sensed force of an electrical connector, which is disclosed in a co-pening patent application entitled "Apparatus for Measuring Positively-sensed Force of an Electrical Connector" filed by the same Applicant, such that manufacturers of electrical connector may conveniently, and easily measure the positively-sensed clamping force of their connector products effecting to circuit boards. It is worthy to note that, though in the preferred embodiments as discussed in this invention, the device being calibrated is an apparatus for measuring positively-sensed force of an electrical connector, this invention is not limited to such a calibration application. In other words, this invention may also be used as a calibration device or method for calibrating other apparatus.

This invention is primarily related to a calibration instrument for micro-positively-sensed force and calibration method therefor, where the instrument is implemented in an apparatus for measuring positively-sensed force of an electrical connector to measure a calibration curve of load (positively-sensed force) vs. strain value and a calibration curve of displacement vs. strain value, such that upon insertion of this invention into the electrical connector, value of the positively-sensed force is obtainable by matching the strain value displayed in a signal amplifying device with the two calibration curves. Detailed structure and features of such an apparatus for measuring positively-sensed force of an electrical connector are disclosed in a co-pening patent application entitled "Apparatus for Measuring Positively-sensed Force of an Electrical Connector" filed by the same Applicant.

The structure and advantages of this invention may be clearly understood by referring to the following illustrations and descriptions of preferred embodiments.

DETAILED EXPLANATIONS OF PREFERRED EMBODIMENTS

Figure 1:
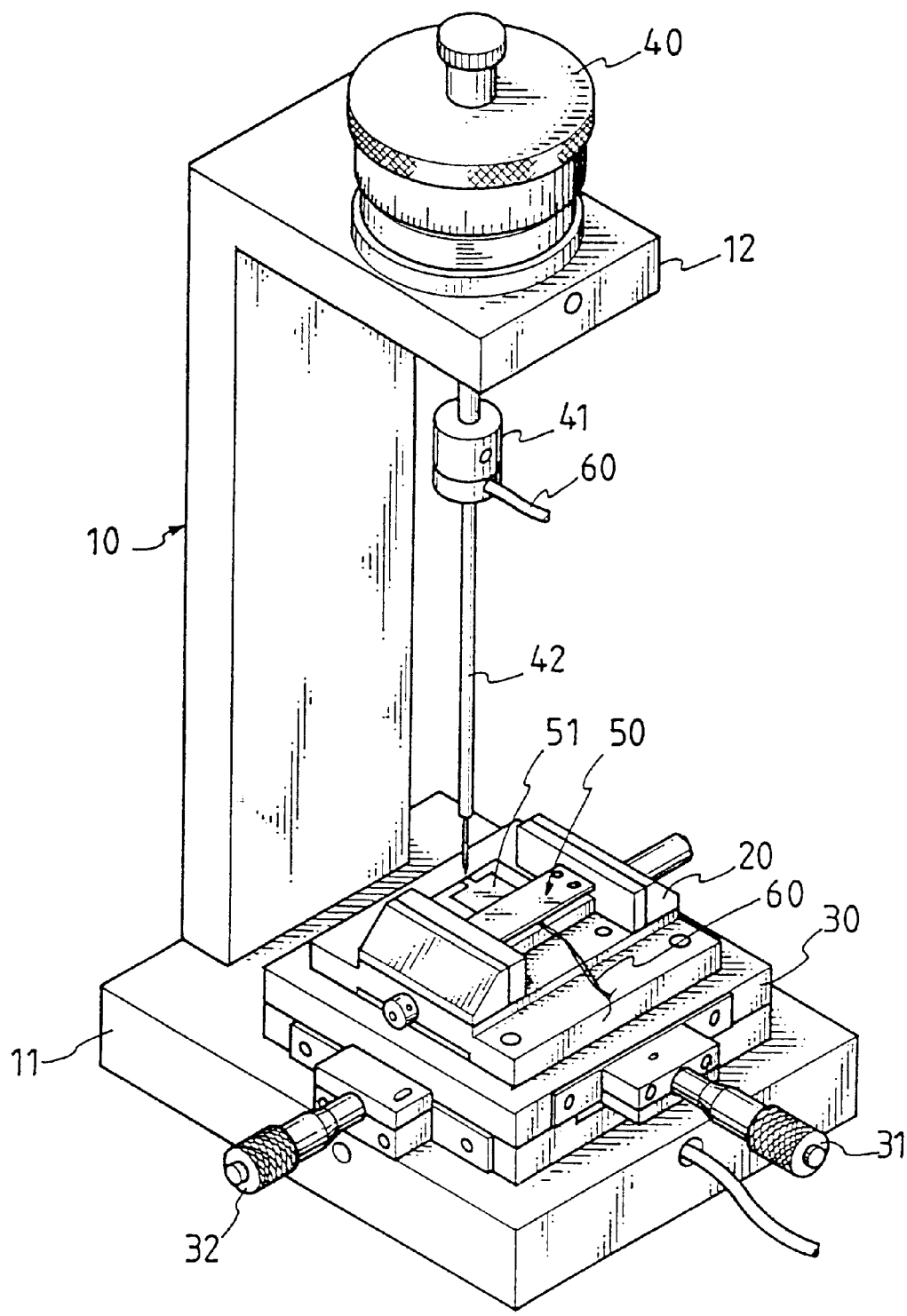
FIG. 1 illustrates an overall appearance of a calibration instrument for-micro-positively-sensed force according to this invention.

This invention relates to a calibration instrument for micro-positively-sensed force. Preferred embodiments of this invention are described in detailed as follows. FIG. 1 illustrates an overall appearance of this invention, including a ⊐-shaped platform support stand 10 having a base 11 being provided with a 2-dimensional displacement micro-adjustment device 30. The 2-dimensional displacement micro-adjustment device 30 is provided with a vise 20 thereon for clamping an elastically deformable strain measuring device to be calibrated. In this particular preferred embodiment of this invention, the elastically deformable strain measuring device to be calibrated is an apparatus for measuring positively-sensed force of an electrical connector 50 having an elastically deformable sheet 51 on which is provided with strain gauges 53. The 2-dimensional displacement micro-adjustment device 30 is provided for users to adjust horizontal position of the apparatus for measuring positively-sensed force of an electrical connector 50 as desired. A micro-distance meter 40 is provided on an upper portion 12 of the platform support stand 10. A probe 42 is connected to and positioned beneath the micro-distance meter 40. Displacement of the probe 42 in vertical direction is adjustable through the micro-distance meter 40, which also displays displacement value of the probe 42. Furthermore, the probe 42 is provided with a load cell 41 thereon for measuring force amplitude which the probe 42 exerts on the apparatus for measuring positively-sensed force of an electrical connector 50. The load cell 41 and the apparatus for measuring positively-sensed force of an electrical connector 50 are each connected to at least one signal transmitting device 60 which outputs signals thereof to a signal amplifying device (not shown) so as to simultaneously display the force and strain value being measured.

Figure 2:
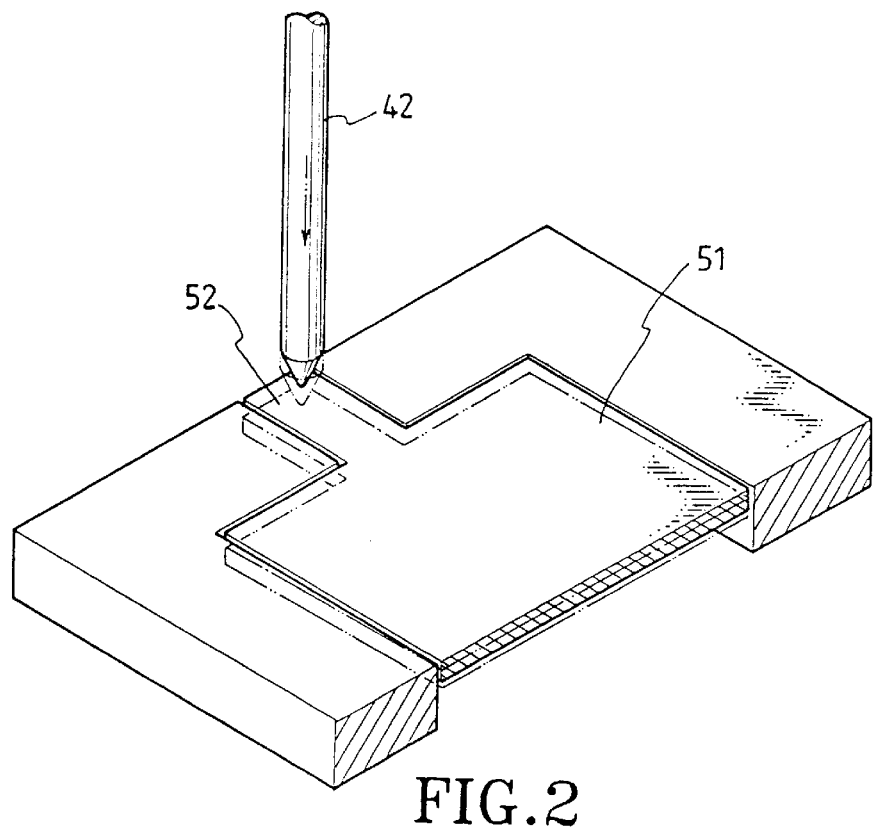
FIG. 2 is a partial enlarged schematic view illustrating a probe and an apparatus for measuring positively-sensed force of an electrical connector under calibration.
Figure 3:
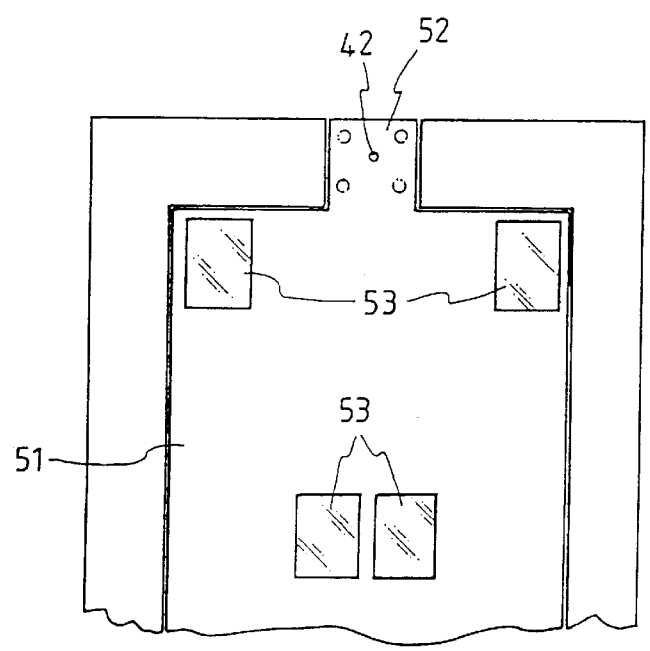
FIG. 3 is a partial enlarged schematic planar view illustrating an apparatus for measuring positively-sensed force of an electrical connector under calibration.

FIG. 2 illustrates deformation state of the elastically deforamble sheet 51 prior to and after the probe 42 exerting a force on a projective measuring region 52 of the apparatus for measuring positively-sensed force of an electrical connector 50. In actual implementation of the apparatus for measuring positively-sensed force of an electrical connector 50, because it is unlikely that every insertion of the projective measuring region 52 into the electrical connector results in an identical contact position between the projective measuring region 52 and connector terminals ends, the vise 20 is provided on the 2-dimensional micro-adjustment device 30 that may adjust horizontal portion of the apparatus for measuring positively-sensed force of an electrical connector 50 via adjusting knobs 31, 32. As shown in FIG. 3, the probe 42 is preferred to exert force on various locations of the projective measuring region 52 in order to identify how different force-exerting locations effect measurements taken by the apparatus for measuring positively-sensed force of an electrical connector 50. In particular, one feature of the apparatus for measuring positively-sensed force of an electrical connector 50 under calibration in this invention, resides in where its fours strain gauges are located. The particular locations of the strain gauges eliminate possible measurement errors resulted from different contact positions between connector terminals and the projective measuring region 52. References may be made to the co-pening patent application entitled "Apparatus for Measuring Positively-sensed Force of an Electrical Connector (2)" filed by the same Applicant for the proper locations and design concepts of where the strain gauges 53 should be located. It is found that implementation of the above measuring technique of varying the force-exerting locations indeed eliminates possible measurement errors resulted from different contact positions between connector terminals and the projective measuring region 52 while the apparatus for measuring positively-sensed force of an electrical connector 50 is later implemented in actual operations such that strain value of the elastically deformable sheet 51 may be accurately measured by the apparatus 50.

This invention is also concerned with a method for using the above calibration instrument for micro-positively-sensed force to calibrate a device. The method comprises the following steps of: (1) clamping a elastically deforamble strain measuring device, (which is not limited to the apparatus for measuring positively-sensed force of an electrical connector 50 as illustrated in the preferred embodiment,) to the base 11 of the platform support stand 10 through the vise 20; (2) adjusting the 2-dimensional micro-adjustment device 30 to move the apparatus for measuring positively-sensed force of an electrical connector 50 to a desired horizontal position; (3) adjusting the micro-distance meter 40 such that the probe 42 connected thereto gently strokes the apparatus for measuring positively-sensed force of an electrical connector 50, that is, a surface of the projective measuring region 52 of the elastically deformable sheet 51, and then resetting the micro-distance meter 40 and the two signal amplifying devices (not shown); (4) adjusting the micro-distance meter 40 such that the probe 42 moves vertically downward and exerts force on the apparatus for measuring positively-sensed force of an electrical connector 50, and recording displacement value displayed on the micro-distance meter 40 and the force and strain value displayed on the two signal amplifying devices for each appropriate force interval, such as 5 g or 10 g; and (5) plotting two calibration curves based on the forces and the displacement values being recorded vs. the strain values.

Figure 4A:
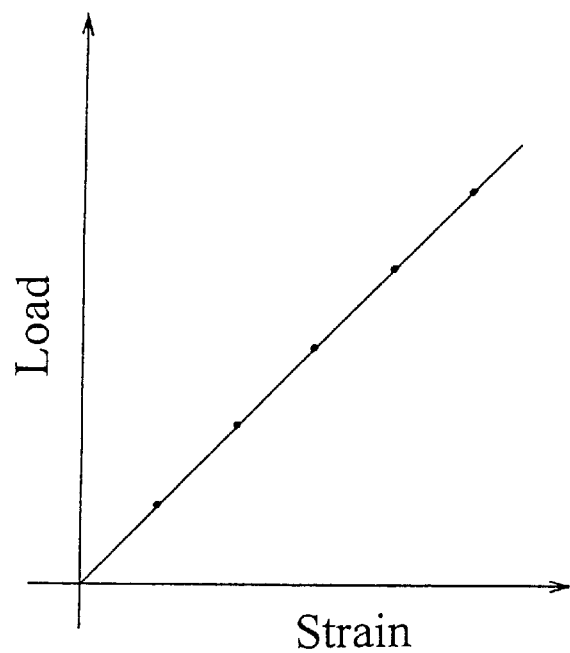
FIG. 4a is a schematic view illustrating a calibration curve of load (positively-sensed force) of the apparatus for measuring positively-sensed force of an electrical connector vs. strain value.
Figure 4B:
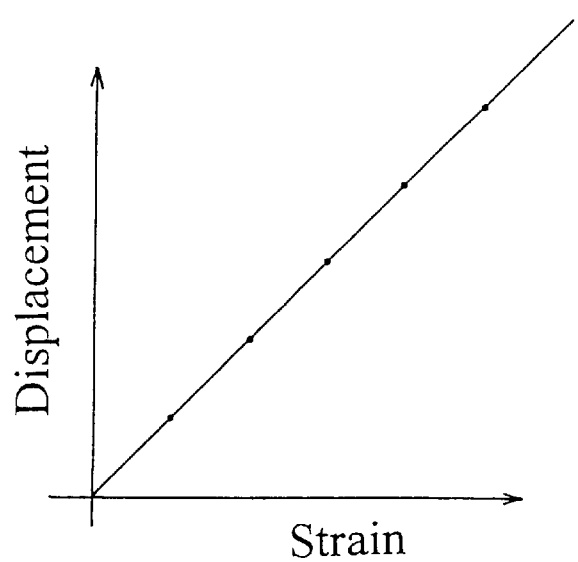
FIG. 4b is a schematic view illustrating a calibration curve of displacement vs. strain value.

Upon completion of the above procedures, a calibration curve of load (positively-sensed force) vs. strain value, and a calibration curve of displacement vs. strain value, such as those illustrated in FIGS. 4a and 4b, respectively, may be plotted accordingly. Normally, these two calibration curves are each a linear line passing through the origin. Hence, when the apparatus for measuring positively-sensed force of an electrical connector 50 is later inserted into connector terminals, value of the positively-sensed clamping force is obtainable by matching the strain value being measured, with the calibration curve shown n FIG. 4a. Furthermore, the terminals will also be displaced while experiencing pressure of the apparatus for measuring positively-sensed force of an electrical connector 50 into connector upon insertion of the apparatus into the connector terminals, measurement errors resulted from deformation of the connector terminals are thus restored from the calibration curve of displacement vs. strain value (FIG. 4b).

This invention may be used to calibrate the apparatus for measuring positively-sensed force of an electrical connector so as to measure the strain value and displacement value of the apparatus upon inserting the apparatus into the electrical connector, whereby the positively-sensed clamping force of the connector terminals effecting to the circuit board may be obtained, wherein the measurements may be used as a basis for verifying results of finite elements analysis currently being adopted for acquiring positively-sensed force, whereby reliable techniques for analyzing positively-sensed force of electrical connectors may be established so as to assist manufactures of electrical connectors in engineering new products or in improving currently available products. This invention not only enhances product reliability, but also promotes further development of electrical connectors of higher precision.

This invention is related to a novel device that makes breakthroughs in conventional art. Aforementioned explanations are directed to the descriptions of preferred embodiments according to the present invention. Various changes and implementations can be made by those skilled in the art without departing from the technical concept of the present invention. Such changes to certain features of the preferred embodiments without altering the overall basic functions of the invention are contemplated by and included in the scope of the appended claims.

What is claimed is:

1. A calibration instrument for micro-positively-sensed force, comprising:
    a platform support stand having a base being provided with a vise thereon for clamping an elastically deformable strain measuring device to be calibrated; a micro-distance meter provided at an upper portion of the platform support; a probe connected to and positioned beneath the micro-distance meter, displacement of the probe in a vertical direction being adjustable through the micro-distance meter, the probe being provided with a load cell being connected to at least one signal transmitting device which outputs signals thereof to a signal amplifying device, the probe being suitable for contacting the elastically deformable strain measuring device at a localized area.

2. The calibration instrument for micro-positively-sensed force according to claim 1, wherein the elastically deformable strain measuring device to be calibrated is provided with at least one strain gauge thereon, the strain gauge being connected to at least one signal transmitting device which outputs signals thereof to a signal amplifying device.

3. The calibration instrument for micro-positively-sensed force according to claim 2, wherein the vise is provided on a 2-dimensional displacement micro-adjustment device for adjusting horizontal position of the elastically deformable strain measuring device.

4. The calibration instrument for micro-positively-sensed force according to claim 2, wherein the elastically deformable strain measuring device is an apparatus for measuring positively-sensed force of an electrical connector.

5. The calibration instrument for micro-positively-sensed force according to claim 4, wherein the apparatus for measuring positively-sensed force of an electrical connector includes an elastically deformable sheet.

6. The calibration instrument for micro-positively-sensed force according to claim 5, wherein the elastically deformable sheet is formed with a projective measuring region at an end thereof.

7. The calibration instrument for micro-positively-sensed force according to claim 1, wherein the platform support stand is in a ⊐-shape.

8. A method for calibrating a calibration instrument for micro-positively-sensed force that uses a calibration instrument for micro-positively-sensed force, the calibration instrument comprising:
    a platform support stand having a base being provided with a vise thereon for clamping an elastically deformable strain measuring device to be calibrated; a micro-distance meter provided at an upper portion of the platform support; a probe connected to and positioned beneath the micro-distance meter, displacement of the probe in a vertical direction being adjustable through the micro-distance meter, the probe being provided with a load cell being connected to at least one signal transmitting device which outputs signals thereof to a signal amplifying device; wherein the elastically deformable strain measuring device to be calibrated is provided with at least one strain gauge thereon, the strain gauge being connected to at least one signal transmitting device which outputs signals thereof to a signal amplifying device; the method comprising the steps of:
    (1) clamping an elastically deformable strain measuring device to be calibrated to the base of the platform support stand through the vise;
    (2) adjusting the micro-distance meter such that the probe connected thereto gently strokes the elastically deformable strain measuring device to be calibrated, and then resetting the micro-distance meter and the two signal amplifying devices;
    (3) adjusting the micro-distance meter such that the probe moves vertically downward and exerts force on the elastically deformable strain measuring device to be calibrated, and recording displacement value displayed on the micro-distance meter and the force and strain value displayed on the two signal amplifying devices for each appropriate force interval; and
    (5) plotting two calibration curves based on the forces and the displacement values being recorded vs. the strain values;
    whereby when the elastically deformable strain measuring device is later inserted into connector terminals, values of positively-sensed clamping force of the connector terminals are obtainable by matching the strain value being measured with the two calibration curves.

9. The method according to claim 8, wherein the elastically deformable strain measuring device is an apparatus for measuring positively-sensed force of an electrical connector.

10. The method according to claim 9, wherein the apparatus for measuring positively-sensed force of an electrical connector includes an elastically deformable sheet.

11. The method according to claim 10, wherein the elastically deformable sheet is formed with a projective measuring region at an end thereof.

12. The method according to claim 8, wherein the platform support stand is in a ⊐-shape.

13. A method for calibrating a calibration instrument for micro-positively-sensed force that uses a calibration instrument for micro-positively-sensed force, the calibration instrument comprising:
    a platform support stand having a base being provided with a vise thereon for clamping an elastically deformable strain measuring device to be calibrated, the vise being provided on a 2-dimensional displacement micro-adjustment device for adjusting horizontal position of the elastically deformable strain measuring device; a micro-distance meter provided at an upper portion of the platform support; a probe connected to and positioned beneath the micro-distance meter, displacement of the probe in a vertical direction being adjustable through the micro-distance meter, the probe being provided with a load cell being connected to at least one signal transmitting device which outputs signals thereof to a signal amplifying device; wherein the elastically deformable strain measuring device to be calibrated is provided with at least one strain gauge thereon, the strain gauge being connected to at least one signal transmitting device which outputs signals thereof to a signal amplifying device; the method comprising the steps of:

(1) clamping an elastically deformable strain measuring device to be calibrated to the base of the platform support stand through the vise;

(2) adjusting the 2-dimensional micro-adjustment device to move the elastically deformable strain measuring device to be calibrated to a desired horizontal position;

(3) adjusting the micro-distance meter such that the probe connected thereto gently strokes the elastically deformable strain measuring device to be calibrated, and then resetting the micro-distance meter and the two signal amplifying devices;

(4) adjusting the micro-distance meter such that the probe moves vertically downward and exerts force on the elastically deformable strain measuring device to be calibrated, and recording displacement value displayed on the micro-distance meter and the force and strain value displayed on the two signal amplifying devices for each appropriate force interval; and (5) plotting two calibration curves based on the forces and the displacement values being recorded vs. the strain values;

whereby when the elastically deformable strain measuring device is later inserted into connector terminals, values of positively-sensed clamping force of the connector terminals are obtainable by matching the strain value being measured, with the two calibration curves.

14. The method according to claim 13, wherein the elastically deformable strain measuring device is an apparatus for measuring positively-sensed force of an electrical connector.

15. The method according to claim 14, wherein the apparatus for measuring-positively-sensed force of an electrical connector includes an elastically deformable sheet.

16. The method according to claim 15, wherein the elastically deformable sheet is formed with a projective measuring region at an end thereof.

17. The method according to claim 13, wherein the platform support stand is in a ⊓-shape.

* * * * *